T. P. SALLEY.
HOSE COUPLING.
APPLICATION FILED OCT. 13, 1917.
1,307,273.
Patented June 17, 1919.
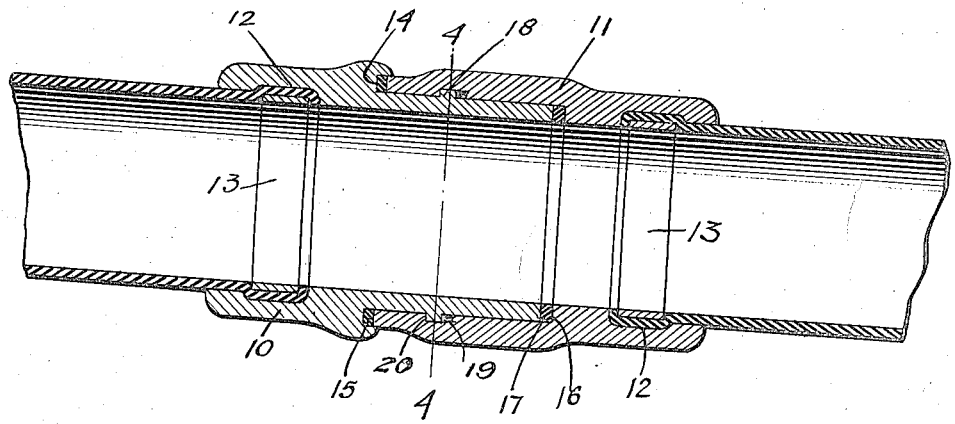
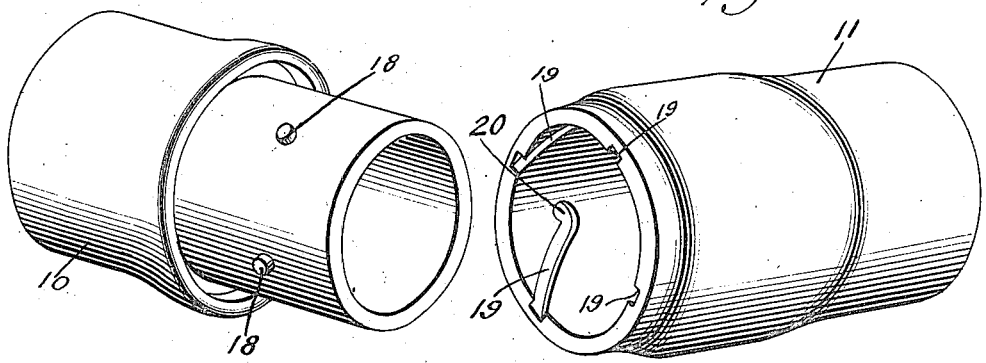
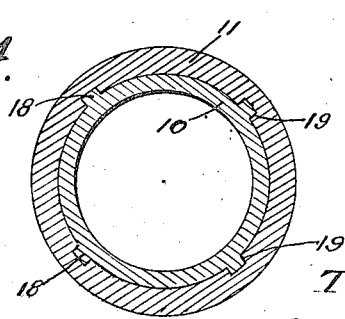
WITNESSES
A. V. Doyle
Hugh H. Ott
INVENTOR
Thomas P. Salley,
BY Victor J. Evans
ATTORNEY

UNITED STATES PATENT OFFICE.

THOMAS P. SALLEY, OF BROOKLYN, NEW YORK.

HOSE-COUPLING.

1,307,273. Specification of Letters Patent. Patented June 17, 1919.

Application filed October 13, 1917. Serial No. 196,480.

*To all whom it may concern:*

Be it known that I, THOMAS P. SALLEY, a citizen of the United States, residing at Brooklyn, in the county of Kings and State of New York, have invented new and useful Improvements in Hose-Couplings, of which the following is a specification.

This invention relates to the class of hose couplings and has for its principal object the provision of mating male and female pipe sections which are slidably fitted together and adapted for relative rotation, each of said sections having an annular rabbeted portion receiving an elastic gasket, so that the end of one section is adapted to come wholly in contact with the gasket of the next adjacent section whereby, under the inherent elasticity of both gaskets, there will exist in the structure, a tendency of the mating sections to slightly separate and in connection with the mentioned sections, I employ means on one section and means on the other section, the latter co-acting with the former so as to cause both sections to be drawn together to establish compressing contact of the sections with the gaskets when the sections are rotated in one direction and operatively brought together.

Another object of the invention is to provide a hose coupling which will consist of mating sections each having a gasket, the said sections being slidably and rotatably connected together whereby both sections will be effectually drawn together against the mentioned gaskets and I combine with said sections, means for forcing the same against the gaskets and for subsequently setting up a locking connection between the sections under the inherent elasticity of the gaskets.

With the above and other objects in view which will appear as the nature of the invention is better understood, the same consists in the improved construction and novel arrangements of parts which will hereinafter be fully described and particularly pointed out in the claims.

In the accompanying drawings, has been illustrated, a single and preferred form of the invention, it being, however, understood that no limitations are necessarily made to the precise structural details therein exhibited, but that changes, alterations and modifications within the scope of the claims may be resorted to when desired.

In the drawings:—

Figure 1 is a vertical longitudinal section through the coupling.

Fig. 2 is a perspective view of the male section.

Fig. 3 is a similar view of the female section.

Fig. 4 is a transverse section on the line 4—4 of Fig. 1.

Referring to the drawings by characters of reference, 10 and 11, designate the mating male and female sections of the coupling, both of which are provided with a hose receiving channel 12, which is adapted to receive the extremity of the hose, the same being secured in place by means of a split band 13, which is expanded into the channels 12, as shown. The portion 10, is provided with an annular rabbeted portion 14, which receives the rubber gasket 15, and the female member 11 is provided with a shoulder or rabbeted portion 16, which receives the gasket 17. The gaskets 15 and 17, are adapted to co-act respectively with the free extremities of the members 10 and 11, which are brought into contact with each other by means of the pins or studs 18, provided on the member 10, co-acting with the spirally arranged grooves 19, with which the member 11, is provided. It will be understood upon movement of the member 11, in one direction, upon the member 10, the free extremities of the same will be brought into compressing contact with the gaskets. The grooves 19, are provided with off-set locking portions 20, and the resiliency of the gaskets will force the pins into these locking extensions when the same have reached the limit of their movement whereby a water tight joint is established and maintained between the members 10 and 11.

While I have shown and described a simple and preferred form of my invention, I wish to have it understood that this disclosure is merely illustrative of my idea and if desired, changes and alterations which fall within the scope of the appended claim may be resorted to when desired.

What is claimed as new is:—

A hose coupling comprising male and female pipe sections each having an annular rabbeted portion and an annular gasket fitting said portion, said sections slidably fitting each other whereby the end of each section comes in flat contact with the gasket associated with the other section, cylindrical studs on one of said sections, the other section having slots therein disposed spirally of said section and opening at their outer ends directly onto the end of said section and closing against the next adjacent gasket when both sections are together, the slots and studs coacting with each other whereby when the sections are turned relatively they will be drawn toward each other to cause the ends of said sections to compressingly engage against said gaskets, each slot having a closed end which is deflected from the longitudinal line of the slot and toward the adjacent end of the section to define a retaining pocket, said studs lodging in said pockets when said sections are connected, and the gaskets serving under their inherent elasticity to hold the studs in said pockets.

In testimony whereof I affix my signature.

THOMAS P. SALLEY.